United States Patent
Dabic et al.

(10) Patent No.: US 11,455,037 B2
(45) Date of Patent: Sep. 27, 2022

(54) CONTROL DEVICE FOR A MOTOR VEHICLE

(71) Applicant: DAV, Créteil (FR)

(72) Inventors: Stéphanie Dabic, Créteil (FR); Nour-Eddine El-Ouardi, Créteil (FR)

(73) Assignee: DAV, Créteil (FR)

( * ) Notice: Subject to any disclaimer, the term of this patent is extended or adjusted under 35 U.S.C. 154(b) by 268 days.

(21) Appl. No.: 15/514,975

(22) PCT Filed: Oct. 2, 2015

(86) PCT No.: PCT/FR2015/052655
§ 371 (c)(1),
(2) Date: Mar. 28, 2017

(87) PCT Pub. No.: WO2016/051114
PCT Pub. Date: Apr. 7, 2016

(65) Prior Publication Data
US 2017/0220118 A1  Aug. 3, 2017

(30) Foreign Application Priority Data
Oct. 2, 2014  (FR) ...................................... 1459456

(51) Int. Cl.
*G06F 3/00* (2006.01)
*G06F 3/01* (2006.01)
(Continued)

(52) U.S. Cl.
CPC .............. *G06F 3/016* (2013.01); *B60K 35/00* (2013.01); *B60K 37/06* (2013.01); *B60W 50/16* (2013.01);
(Continued)

(58) Field of Classification Search
CPC ...... G06F 3/016; G06F 3/0412; G06F 3/0414; G06F 3/0416; G06F 3/04886;
(Continued)

(56) References Cited

U.S. PATENT DOCUMENTS 5,402,503 A * 3/1995 Prokisch ................ H04R 9/025
381/412
6,587,097 B1 * 7/2003 Aufderheide ........... G06F 3/045
345/104
(Continued)

FOREIGN PATENT DOCUMENTS

EP   2 733 576 A1   5/2014
EP   2 759 915 A2   7/2014

OTHER PUBLICATIONS

Penn, "What is Sound?", online as of 2009, 5 pages + 1 page disclosing date (6 pages).*
(Continued)

*Primary Examiner* — William L Bashore
*Assistant Examiner* — David Faber
(74) *Attorney, Agent, or Firm* — Osha Bergman Watanabe & Burton LLP

(57) ABSTRACT

The invention relates to a control device for a motor vehicle, comprising: a tactile surface (2) for detecting the contact of the finger of a user and the movement of the finger on the tactile surface; and a haptic and/or acoustic feedback module (4) designed to make the tactile surface (2) vibrate and/or to generate an acoustic feedback for the user, in response to contact on the tactile surface (2); characterised in that it comprises a management unit (5) designed to manage the haptic feedback and/or acoustic feedback module (4) in order to generate a haptic and/or acoustic feedback of which at least one parameter of the haptic and/or acoustic feedback varies with the direction of movement of the finger on the (Continued)

tactile surface (2). The invention also relates to a control method.

10 Claims, 1 Drawing Sheet

(51) Int. Cl.
  *B60K 35/00* (2006.01)
  *B60K 37/06* (2006.01)
  *G06F 3/04886* (2022.01)
  *B60W 50/16* (2020.01)
  *G06F 3/041* (2006.01)
(52) U.S. Cl.
  CPC .......... *G06F 3/0412* (2013.01); *G06F 3/0416* (2013.01); *G06F 3/04886* (2013.01); *B60K 2370/1438* (2019.05); *B60K 2370/157* (2019.05); *B60K 2370/158* (2019.05)
(58) Field of Classification Search
  CPC ...... G06F 2203/014; B06K 2350/1024; B06K 2350/1028; B60K 35/00; B60K 37/06; B60K 2370/158; B60K 2370/1438; B60K 2370/157; B60W 50/16
  USPC .................................................. 715/701, 702
  See application file for complete search history.

(56) References Cited

U.S. PATENT DOCUMENTS

| | | | | |
|---|---|---|---|---|
| 7,167,573 B2 * | 1/2007 | Williamson | ............. | H04R 9/06 381/403 |
| 2003/0190051 A1 * | 10/2003 | Williamson | ............. | H04R 9/06 381/398 |
| 2007/0057781 A1 * | 3/2007 | Breed | ................. | H01Q 1/3233 340/457.1 |
| 2007/0063975 A1 * | 3/2007 | Katzenberger | ......... | G05G 9/047 345/161 |
| 2007/0091063 A1 * | 4/2007 | Nakamura | ............. | G06F 3/016 345/156 |
| 2007/0236450 A1 * | 10/2007 | Colgate | ................... | G06F 3/016 345/156 |
| 2008/0024459 A1 * | 1/2008 | Poupyrev | ................ | G06F 3/016 345/173 |
| 2008/0055244 A1 * | 3/2008 | Cruz-Hernandez | ..... | G06F 3/016 345/157 |
| 2008/0231605 A1 * | 9/2008 | Yang | ..................... | G06F 3/0416 345/173 |
| 2008/0317276 A1 * | 12/2008 | Sorensen | ............... | H04R 9/063 381/401 |
| 2009/0003645 A1 * | 1/2009 | Andersen | ................. | H04R 9/04 381/405 |
| 2009/0015555 A1 * | 1/2009 | Takashima | ............. | G06F 3/016 345/158 |
| 2009/0292989 A1 * | 11/2009 | Matthews | ........... | G06F 3/04883 715/702 |
| 2009/0322699 A1 * | 12/2009 | Hansson | ............... | G06F 3/0416 345/174 |
| 2010/0156818 A1 * | 6/2010 | Burrough | ................ | G06F 3/016 345/173 |
| 2010/0164697 A1 * | 7/2010 | Kang | .................... | H04M 19/04 340/407.1 |
| 2010/0302016 A1 * | 12/2010 | Zaborowski | ........... | G06F 3/018 340/407.2 |
| 2011/0215914 A1 * | 9/2011 | Edwards | ................ | G06F 3/041 340/407.2 |
| 2011/0227849 A1 * | 9/2011 | Olien | ...................... | G06F 3/016 345/173 |
| 2011/0261021 A1 * | 10/2011 | Modarres | ................ | G06F 3/016 345/177 |
| 2012/0038582 A1 * | 2/2012 | Grant | ..................... | G06F 3/016 345/174 |
| 2012/0154134 A1 * | 6/2012 | Lim | ....................... | G06F 3/016 340/407.2 |
| 2012/0200176 A1 * | 8/2012 | Park | ..................... | G02B 27/646 310/12.16 |
| 2012/0229400 A1 | 9/2012 | Birnbaum et al. | | |
| 2012/0299857 A1 * | 11/2012 | Grant | ..................... | G06F 3/016 345/173 |
| 2013/0076686 A1 * | 3/2013 | Kono | ..................... | G06F 3/0416 345/173 |
| 2013/0104039 A1 * | 4/2013 | Ormin | ................... | G06F 3/0488 715/702 |
| 2013/0169424 A1 * | 7/2013 | Kujawski | ............ | G06F 3/03543 340/407.2 |
| 2013/0207904 A1 * | 8/2013 | Short | ..................... | G06F 3/016 345/173 |
| 2013/0215079 A1 * | 8/2013 | Johnson | .................. | G06F 3/016 345/174 |
| 2013/0258570 A1 * | 10/2013 | Nashiki | ................... | G06F 3/044 361/679.01 |
| 2013/0265149 A1 * | 10/2013 | Nakamura | ............... | G06F 3/016 340/407.1 |
| 2014/0049505 A1 * | 2/2014 | Radivojevic | ........ | G06F 3/04883 345/174 |
| 2014/0078102 A1 * | 3/2014 | Araki | ...................... | G06F 3/016 345/174 |
| 2014/0098038 A1 * | 4/2014 | Paek | ...................... | G06F 1/1692 345/173 |
| 2014/0118127 A1 * | 5/2014 | Levesque | ................ | G06F 3/016 340/407.2 |
| 2014/0139448 A1 * | 5/2014 | Levesque | ................ | G06F 3/041 345/173 |
| 2014/0139450 A1 * | 5/2014 | Levesque | ................ | G08B 6/00 345/173 |
| 2014/0139451 A1 * | 5/2014 | Levesque | ................ | G06F 3/016 345/173 |
| 2014/0168107 A1 * | 6/2014 | Kim | ....................... | G06F 3/0488 345/173 |
| 2014/0168124 A1 * | 6/2014 | Park | ........................ | G06F 3/016 345/173 |
| 2014/0176455 A1 * | 6/2014 | Araki | ...................... | G06F 3/016 345/173 |
| 2014/0184528 A1 * | 7/2014 | Chen | ................... | G06F 3/04883 345/173 |
| 2014/0210756 A1 * | 7/2014 | Lee | .......................... | G06F 3/016 345/173 |
| 2014/0218317 A1 * | 8/2014 | berg | ....................... | G06F 3/0488 345/173 |
| 2014/0292668 A1 * | 10/2014 | Fricklas | .................. | G06F 3/041 345/173 |
| 2014/0368445 A1 * | 12/2014 | Feng | ..................... | G06F 3/016 345/173 |
| 2015/0054635 A1 * | 2/2015 | Saddik | .................... | G06F 3/016 340/407.2 |
| 2015/0169059 A1 * | 6/2015 | Behles | ................... | G06F 3/0488 345/173 |
| 2015/0227220 A1 * | 8/2015 | Tabone | .................. | G06F 3/0485 345/173 |
| 2015/0293592 A1 * | 10/2015 | Cheong | ................... | G06F 3/016 345/173 |
| 2015/0309573 A1 * | 10/2015 | Brombach | ............. | B60K 37/06 715/702 |
| 2016/0011720 A1 * | 1/2016 | Walther | ............... | G06F 3/04847 345/173 |
| 2016/0027263 A1 * | 1/2016 | Parker | .................... | H02N 2/043 340/407.1 |
| 2016/0357368 A1 * | 12/2016 | Federighi | ............. | G06F 3/0488 |
| 2017/0272654 A1 * | 9/2017 | Poindexter, Jr. | ... | H04N 5/23245 |
| 2017/0323092 A1 * | 11/2017 | Thakur | ................... | G06F 21/36 |
| 2017/0357317 A1 * | 12/2017 | Chaudhri | ............. | G06F 3/0412 |
| 2019/0050073 A1 * | 2/2019 | Murakami | ............. | B60K 35/00 |

OTHER PUBLICATIONS

International Search Report issued in corresponding application No. PCT/FR2015/052655 dated Dec. 17, 2015 (6 pages).

(56) References Cited

OTHER PUBLICATIONS

Written Opinion of the International Searching Authority issued in corresponding application No. PCT/FR2015/052655 dated Dec. 17, 2015 (6 pages).
Fourth Office Action in corresponding Chinese Application No. 201580053854.9, dated Mar. 16, 2021 (16 pages).

* cited by examiner

CONTROL DEVICE FOR A MOTOR VEHICLE

The present invention relates to a control device for a motor vehicle and a method for controlling said control device.

In recent years, cars have become easy to handle with the appearance of new emergent technologies (for example, assisted steering, ABS, speed regulator, reversing radar, etc.). Paradoxically however, the number of functions to be controlled while driving has also increased considerably. That can lead to a certain complexity associated with the poor knowledge of the use of these functionalities and their diversity. The car has become a true living space, perceived as a personal and interconnected communication centre: with, for example, the MP3 player, GPS, connection with cell phones.

The introduction of these new functions is reflected by an increase in the number of buttons on the dashboard of a car interior. However, the number of buttons cannot be increased ad infinitum, particularly because of the resulting complexity, the limited space, the accessibility or the cognitive load. Furthermore, the interaction of the driver with the systems embedded in the car can reproduce a situation of attention overload in which the driver cannot best deal with all the information concerning the task of driving, that being reflected by errors and longer detection times.

One possibility is to centralize the buttons by replacing them with a touchscreen. This makes it possible to continue to increase the number of the functions, the latter becoming programmable and reconfigurable and displayed temporarily or permanently depending on the context or the function activated. The screen thus includes a multifunctionality capability, while dematerializing the buttons and being customizable. Furthermore, the screens have three other major advantages: they allow on the one hand a direct interaction (the colocation of the display and input), and on the other hand they are versatile (the display can be easily configured for a certain number of functions), and finally they are intuitive (interaction method that is familiar, such as a "pointer" for example).

However, contrary to the case of a pushbutton, when the driver interacts with the touchscreen, he or she does not receive any feedback linked directly to his or her action on the interface, other than the simple contact of his or her finger rubbing on the screen.

In order to compensate for the loss of information caused by the replacement of conventional mechanical interfaces by touchscreens, provision is made for feedback, such as haptic feedback, to be added to provide the user with feedback from the system. This feedback makes it possible to avoid the possible ambiguity concerning the recognition of the action of the user by the system, which can favour the occurrence of hazardous situations. It must however also avoid overloading the visual and auditory pathways already highly stressed by the task of driving. In effect, the use of touchscreens in a motor vehicle must not divert the attention of the driver.

One aim of the present invention is to provide a control device and a method for controlling said control device, which does not hamper the driving, which is well perceived and appreciated by the users, and which can be discriminated from the other signals for a touchscreen application that observes motor vehicle constraints.

To this end, the subject of the present invention is a control device for a motor vehicle comprising:

a touch surface intended to detect a contact of a finger of a user and the direction of movement of the finger on the touch surface, and a haptic and/or audio feedback module configured to make the touch surface vibrate and/or to generate audio feedback to the user, in response to a contact on the touch surface, characterized in that it comprises a driver unit configured to drive the haptic and/or audio feedback module so as to generate a haptic and/or audio feedback of which at least one parameter of the haptic and/or audio feedback varies with the direction of movement of the finger on the touch surface.

It is thus possible to simulate various textures of the touch surface. The user can thus perceive for example as a function of the direction of movement of the finger a different relief, for example more or less rough, a relief simulating ribs, or small humps etc. These various haptic feedbacks place the user's perception in relief in a different way and the user can thus orient themselves while keeping for example their eyes on the road.

According to one or more features of the control device, taken alone or in combination, a distinct haptic and/or audio feedback is generated at least for two perpendicular directions, the zone of the touch surface around the position of the finger is divided into angular sectors and a distinct haptic and/or audio feedback is generated depending on whether the finger of the user is moving in one or the other of the zones, the zone of the touch surface around the position of the finger is divided into quadrants, the control device comprises a display device disposed under the touch surface to display images through the touch surface, a parameter of the haptic and/or audio feedback varies with the speed of movement of the finger on the touch surface, a parameter of the audio feedback is chosen from the intensity of the volume, the phase, the frequency, the duration, the duration between two identical signals and/or a parameter of the haptic feedback is chosen from the intensity of the acceleration, the frequency, the amplitude, the duration, the duration between two identical signals, the phase.

Another subject of the invention is a method for controlling a control device for a motor vehicle as described previously, characterized in that it comprises the following steps:

a contact of a finger of a user and the direction of movement of the finger on the touch surface are detected, and a haptic and/or audio feedback is generated of which at least one parameter of the haptic and/or audio feedback varies with the direction of movement of the finger on the touch surface.

According to one or more features of the control method, taken alone or in combination, a distinct haptic and/or audio feedback is generated at least for two perpendicular directions, the zone of the touch surface around the position of the finger is divided into angular sectors and a distinct haptic and/or audio feedback is generated depending on whether the finger of the user is moving in one or the other of the zones, a parameter of the haptic and/or audio feedback varies with the speed of movement of the finger on the touch surface.

BRIEF DESCRIPTION OF THE DRAWINGS

Other advantages and features will emerge on reading the description of the invention, and the attached figures which represent a non-limiting exemplary embodiment of the invention and in which.

In these figures, identical elements bear the same reference numbers.

DETAILED DESCRIPTION

Figure 1:
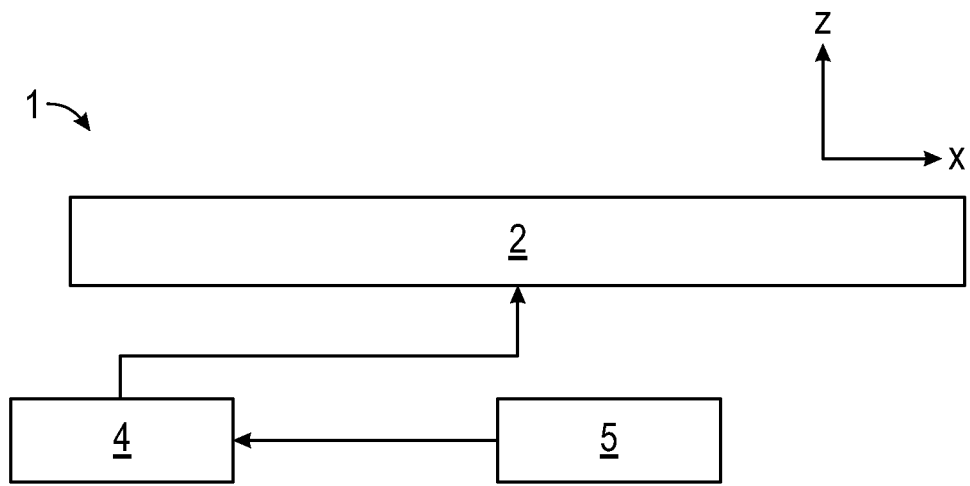
FIG. 1 represents an example of a control device for a motor vehicle.

FIG. 1 represents a motor vehicle control device 1.

The control device 1 comprises a touch surface 2 and a haptic and/or audio feedback module 4.

The touch surface 2 is intended to detect a contact of a finger of a user and the direction of movement of the finger over the touch surface 2.

The haptic and/or audio feedback module 4 is configured to make the touch surface vibrate in response to a contact on the touch surface 2 by a finger or any other activation means (for example a stylus) of a user having for example modified or selected a command and/or to generate an audio feedback to the user in response to a contact on the touch surface 2.

"Haptic" describes a feedback by touch. Thus, the haptic feedback is a vibratory or vibrotactile signal.

The control device 1 can comprise a display device arranged under the touch surface 2 to display images through the touch surface 2, which is then transparent, thus forming a touchscreen.

A touchscreen is an input peripheral device or interface enabling the users of a system to interact therewith by virtue of touch. It allows the direct interaction of the user on the zone that he or she wants to select for various uses such as, for example, the selection of a destination address or of a name in a directory, the settings of the air condition system, the activation of a dedicated function, the selection of a track from a list, or, generally, scrolling through a list of choices, selection, validation, and errors.

The touch surface 2 comprises a plate bearing a contact sensor for detecting a push pressure or a movement of the finger or of a stylus of the user.

The contact sensor is for example a pressure sensor, typically using the FSR (Force Sensing Resistor) technology, that is to say using pressure-sensitive resistors. The FSR technology exhibits a very good strength and robustness, while having a high resolution. Furthermore, it is highly reactive and accurate, while being relatively stable over time. It can have a fairly long life, and can be used with any type of activation means, at a relatively low cost.

According to one design of the FSR technology, the sensor operates by placing two conductive layers in contact for example by the action of the finger. One of the embodiments consists in covering a glass plate with a layer of conductive ink, on which is superposed a sheet of flexible polyester, which is itself covered on its inner face by a layer of conductive ink. Insulating and transparent blocks insulate the plate from the polyester sheet. The activation on the touch surface produces a light depression of the polyester layer, which comes into contact with the conductive layer of the glass plate. The local contact of the two conductive layers results in a modification of the electrical current applied to the plate, corresponding to a voltage gradient.

According to another example, the contact sensor comprises flexible semiconductive layers sandwiched between, for example, a conductive layer and a resistive layer. By exerting a pressure or a dragging action on the FSR layer, its ohmic resistance decreases thus making it possible, by application of an appropriate electrical voltage, to measure the pressure applied and/or the location of the point where the pressure is exerted.

According to another example, the contact sensor is based on a capacitive technology.

The haptic feedback module 4 comprises at least one actuator (not represented) linked to the plate of the touch surface 2, to generate the haptic feedback as a function of a signal from the contact sensor. The haptic feedback is a vibratory signal such as a vibration produced by a sinusoidal control signal or by a control signal comprising a pulse or a succession of pulses, sent to the actuator. The vibration is for example directed in the plane of the touch surface 2 or orthogonally to the plane of the touch surface 2 or even directed according to a combination of these two directions.

In the case of a plurality of actuators, the latter are arranged under the touch surface 2, in different positions (at the center or on one side) or in different orientations (in the direction of the press on the surface or in another axis).

According to an exemplary embodiment, the actuator is based on a technology similar to the loudspeaker (voice coil) technology. It comprises a fixed part and a part that is translationally mobile in an air gap of the fixed part, for example of the order of 200 µm, between a first position and a second position, parallel to a longitudinal axis of the mobile part. The mobile part is for example formed by a mobile magnet sliding in a fixed coil or by a mobile coil sliding around a fixed magnet, the mobile part and the fixed part cooperating by electromagnetic effect. The mobile parts are linked to the plate in such a way that the movement of the mobile parts generates the translational movement of the plate to generate the haptic feedback to the finger of the user. This technology is easy to control and allows the displacement of great masses, like that of a screen, at various frequencies and observes the very strict motor vehicle constraints that are a low cost, a good resistance to high temperature variations, and simplicity of installation.

The control device 1 further comprises a driver unit 5 configured to drive the haptic and/or audio feedback module 4 so as to generate a haptic and/or audio feedback of which at least one parameter of the haptic and/or audio feedback varies with the direction of movement of the finger on the touch surface 2.

The movement of the finger, such as sliding, comprises the information regarding the location of the finger on at least two successive spatial coordinates on the touch surface 2.

A parameter of the audio feedback can be chosen from the intensity of the volume, the phase, the frequency, the duration, the duration between two identical signals.

A parameter of the haptic feedback can be chosen from the intensity of the acceleration, the frequency, the amplitude, the duration, the duration between two identical signals, the phase.

Thus it is, for example, possible to simulate the various textures of the touch surface, such as various surface roughnesses or structures such as ribs, reliefs, etc.

According to an embodiment, there is provision for the zone of the touch surface around the position of the finger to be divided into angular sectors. A distinct haptic and/or audio feedback is generated depending on whether the finger of the user is moving in one or other of the zones.

The zone of the touch surface 2 around the position of the finger is for example divided into quadrans (90°) around the position of the finger P1.

Figure 2:
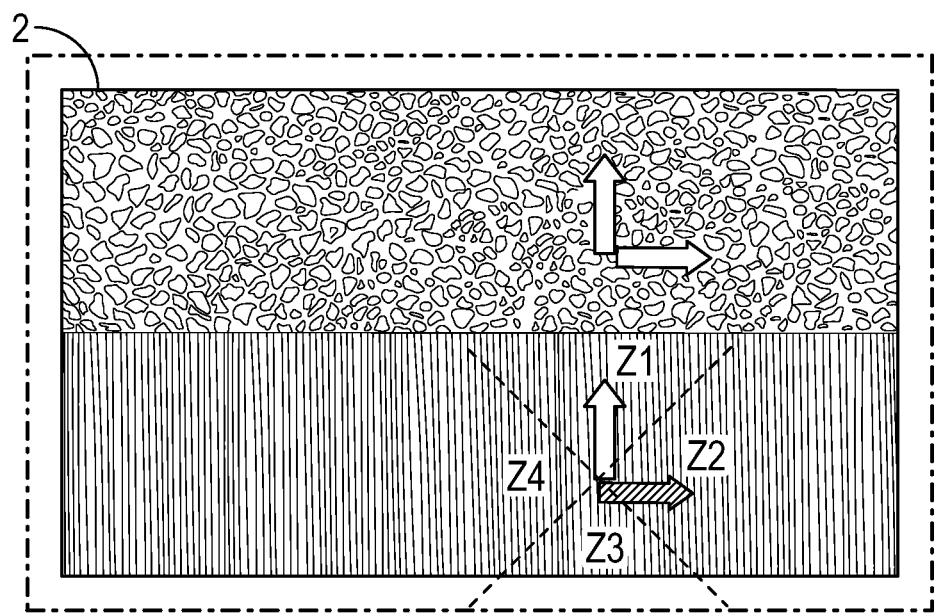
FIG. 2 represents an example of a touch surface.

Thus, four zones Z1, Z2, Z3, Z4 have been represented in FIG. 2.

In this example, if the user moves his finger vertically, upward, in the first zone Z1, a first haptic and/or audio feedback will be generated.

If the user moves his finger toward the right, in the second zone Z2, a second haptic and/or audio feedback, distinct from the first haptic feedback, will be generated.

The second haptic feedback in the horizontal directions (in the zones Z2 and Z4 in FIG. 2), may for example exhibit a shorter duration, a lower amplitude and a shorter duration between two haptic patterns than the first haptic feedback in the vertical directions (Z1 and Z3). It is thus possible to simulate an anisotropic texture of the touch surface.

Provision may be made furthermore to display on the display device patterns corresponding to the haptic and/or audio feedbacks. Thus, for example as may be seen in FIG. 2, a first image displayed under the touch surface 2 represents marked patterns, such as micro-bumps. The haptic and/or audio feedback in this zone may be the same in all directions. A second image displayed represents a smooth metal surface of anisotropic appearance.

Provision may furthermore be made for a parameter of the haptic and/or audio feedback to vary with the speed of movement of the finger on the touch surface 2. For example, the duration between the haptic and/or audio feedback patterns diminish with increasing speed. The simulation of perception of a particular texture is strengthened.

The invention claimed is:

1. A control device for a motor vehicle comprising:
   a touch surface disposed inside the motor vehicle, the touch surface performs two or more functions inside the motor vehicle and detects a contact from a finger of a user inside the motor vehicle and a direction of movement of the finger on the touch surface;
   a haptic feedback actuator that generates a haptic feedback in response to the contact from the finger and the direction of movement of the finger on the touch surface, the haptic feedback being a vibration of the touch surface generated based on a contact of the finger on the touch surface and a displacement of the finger from a first zone of contact with respect to a second zone of contact on the touch screen;
   an audio feedback module that generates an audio feedback in response to the contact from the finger and the direction of movement of the finger on the touch surface, the audio feedback being a sound from the touch surface generated based on a pressure depression on the contact of the finger on the touch surface and the displacement of the finger from the first zone of contact with respect to the second zone of contact on the touch screen; and
   a processor that drives the haptic feedback actuator and the audio feedback module to generate the haptic feedback and the audio feedback,
   wherein:
      a parameter of the haptic feedback and a parameter of the audio feedback vary with the direction of movement of the finger on the touch surface,
      the first zone of contact on the touch surface is around a position of the finger upon the contact of the finger on the touch surface,
      an area around the position of the finger upon the contact of the finger on the touch surface is divided into a plurality of angular sectors,
      the haptic feedback actuator is based on voice coil technology and comprises a fixed part and a part that is translationally mobile in an air gap of the fixed part between a first position and a second position, parallel to a longitudinal axis of the mobile part, and the airgap has a length of 200 μm.

2. The control device as claimed in claim 1, wherein:
   each angular sector comprises a distinct haptic feedback and a distinct audio feedback that is generated based on a movement of the finger from the first zone of contact with respect to one out of the plurality of angular sectors of the area such that each of the haptic feedback and the audio feedback places the user's perception in relief in a different way, based upon which the user orients himself/herself while keeping his/her eyes on the road, and
   the distinct haptic feedback and the distinct audio feedback is generated based on at least two distinct perpendicular directions of movement of the finger on the touch screen.

3. The control device as claimed in claim 1, wherein the area around the position of the finger upon the contact of on the touch surface is further divided into quadrants separated from one another by the plurality of angular sectors.

4. The control device as claimed in claim 1, further comprising a display device disposed under the touch surface to display images through the touch surface.

5. The control device as claimed in claim 1, wherein the parameter of the haptic feedback and the audio feedback varies with a speed of the movement of the finger on the touch surface.

6. The control device as claimed in claim 1, wherein:
   the parameter of the audio feedback is chosen from a group consisting of: an intensity of the volume, a phase, a frequency, a time duration, and a time duration difference between two identical signals, and
   the parameter of the haptic feedback is chosen from a group consisting of: the intensity of the acceleration, a frequency, an amplitude, a time duration, a time duration difference between two identical signals, and a phase.

7. The control device as claimed in claim 1, wherein the two or more functions comprise selecting of a destination address, selecting a name in a directory, modifying a settings of an air condition system, activating a dedicated function, selecting a track from a list, or generally scrolling through a list of choices, selection, validation, or errors.

8. A method for controlling a control device for a motor vehicle, the control device comprising a touch surface disposed inside the motor vehicle that performs two or more functions inside the motor vehicle and detects a contact from a finger of a user inside the motor vehicle and a direction of movement of the finger on the touch surface, a haptic feedback actuator configured to generate a haptic feedback in response to the contact from the finger and the direction of movement of the finger on the touch surface, an audio feedback module configured to generates an audio feedback in response to the contact from the finger and the direction of movement of the finger on the touch surface, a processor configured to drive the haptic feedback actuator and the audio feedback module to generate the haptic feedback pattern and the audio feedback pattern, wherein at least one parameter of the haptic feedback pattern and the audio feedback pattern vary with the direction of movement of the finger on the touch surface, the method comprising:
- detecting, by the touch surface, the contact from the finger and detecting the direction of movement of the finger on the touch surface;
- driving, by the processor, the haptic feedback actuator and the audio feedback module to generate the haptic feedback pattern and the audio feedback pattern;
- generating, by the haptic feedback actuator, the haptic feedback pattern in response to the contact from the finger and the direction of movement of the finger on the touch surface, the haptic feedback pattern being a vibration sequence of the touch surface generated based on a contact of the finger on the touch screen and a displacement of the finger from a first zone of contact with respect to a second zone of contact on the touch screen;
- generating, by the audio feedback module, the audio feedback pattern in response to the contact from the finger and the direction of movement of the finger on the touch surface, the audio feedback pattern being a sound sequence from the touch surface generated based on a pressure depression on the contact of the finger on the touch screen and the displacement of the finger from the first zone of contact with respect to the second zone of contact on the touch screen;
- wherein a parameter of the haptic feedback pattern and a parameter of the audio feedback pattern vary with the direction of movement of the finger on the touch surface,
- wherein the haptic feedback actuator is based on voice coil technology and comprises a fixed part and a part that is translationally mobile in an air gap of the fixed part between a first position and a second position, parallel to a longitudinal axis of the mobile part, and wherein the airgap has a length of 200 μm.

9. The method of control as claimed in claim 8, wherein a distinct haptic feedback pattern and a distinct audio feedback pattern are generated based on at least two distinct perpendicular directions of movement of the finger on the touch screen.

10. The method of control as claimed in claim 8, wherein:
- the first zone of contact on the touch surface is around a position of the finger upon the contact of the finger on the touch surface,
- an area around the position of the finger upon the contact of the finger on the touch surface is being divided into a plurality of angular sectors,
- the parameter of the haptic feedback pattern and the audio feedback pattern vary with the speed of the movement of the finger on the touch surface such that a duration between the haptic feedback pattern and a duration between the audio feedback pattern diminish with increasing speed, and
- each angular sector generating a distinct haptic feedback pattern and generating a distinct audio feedback pattern based on a movement of the finger from the first zone of contact with respect to one out of the plurality of angular sectors of the area such that each of the haptic feedback and the audio feedback places the user's perception in relief in a different way, based upon which the user orients himself/herself while keeping his/her eyes on the road.

* * * * *